March 24, 1970    L. ASSALIT    3,502,118
AEROSOL FILLING APPARATUS
Filed Oct. 10, 1966
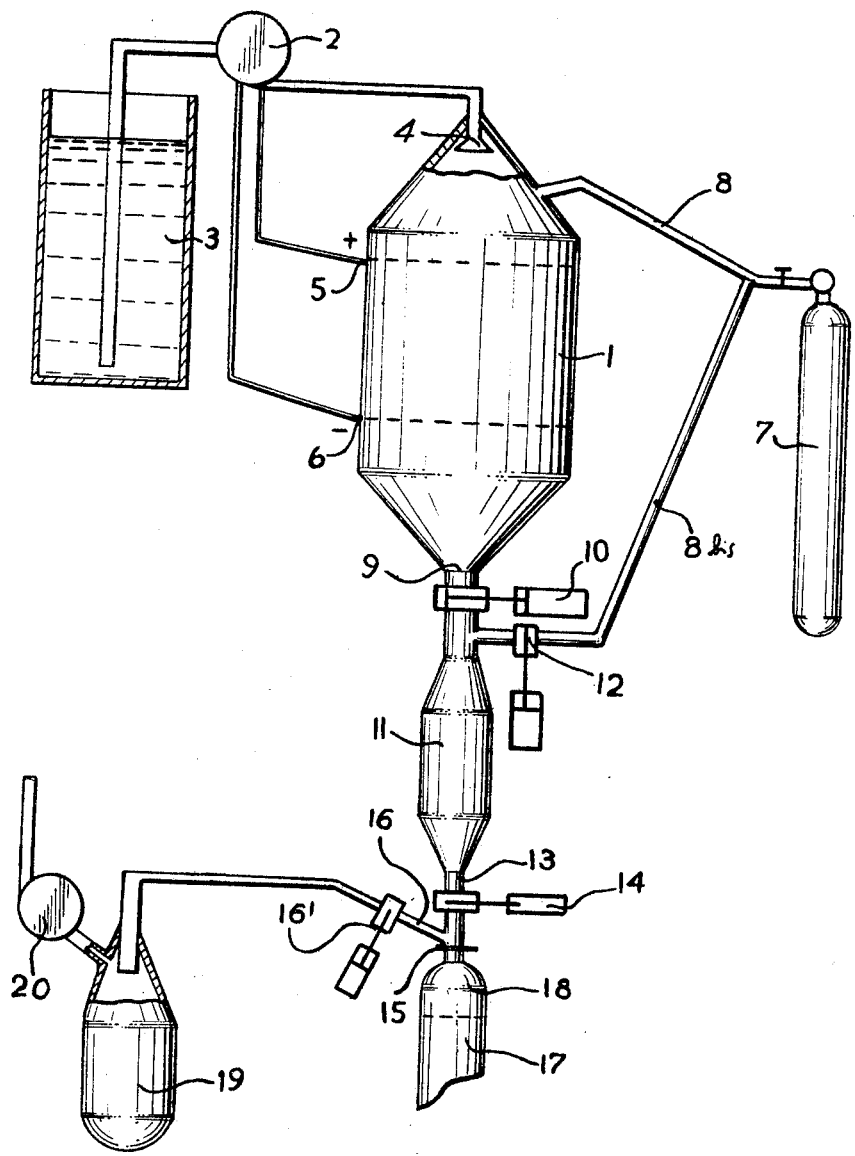
INVENTOR: LOUIS ASSALIT

United States Patent Office 3,502,118
Patented Mar. 24, 1970

3,502,118
AEROSOL FILLING APPARATUS
Louis Assalit, 20 Rue des Colonies, Marseille, France
Filed Oct. 10, 1966, Ser. No. 585,653
Claims priority, application France, Oct. 26, 1965,
21,168
Int. Cl. B65b 1/04, 3/04; B67d 5/40
U.S. Cl. 141—20
4 Claims

ABSTRACT OF THE DISCLOSURE

Apparatus for filling containers with a mixture of liquid product and a propellant gas comprises a mixing chamber having a valved outlet, means for supplying liquid product under pressure to said chamber, means for supplying gas under pressure to said chamber, a metering vessel communicating with the valved outlet and having a valved nozzle for connection to a container to be filled, means for supplying gas under pressure to the metering vessel, and valved means connected to the nozzle of the metering vessel downstream of its valve for applying suction to create a vacuum in a container connected to said nozzle.

---

The purpose of the invention is to provide a device intended for the filling of aerosol flasks fitted with their valves clamped or positioned, in one and the same operational phase, apportioning the active liquid saturated with gas, and selecting the pressure and the complementary quantity of the said gas, as required for propulsion, the system being intended particularly for food products such as cream under pressure, and generally for all products supplied in propulsive gases of a saturated or similar nature.

It is characterized by a combined apparatus comprising a continuous saturation device fed through its apex and by a first conduit for the product to be saturated, which is injected under pressure by a pump, and fed by a second conduit with the saturating gas, the base of the said device being connected, by a conduit fitted with a valve, to a container by which the liquid is apportioned and which itself comprises a flushing gas inlet with a valve, an end-piece by which the product is filled into the flask being connected by its top to the base of the apportioning container by means of a conduit fitted with a valve, it being pointed out that this connecting piece communicates with a vacuum pump.

In the attached drawings, provided by way of an example, without any limitative effect, of one possible embodiment of the invention:

The device is illustrated as a whole, in longitudinal section.

The apparatus consists of a saturator 1 connected by a pump 2 to the stock container 3, the substance being conveyed under pressure to a dividing nozzle.

The pump is controlled by the level contactors 5, 6.

A gas under pressure 7, is conveyed through the conduit 8 to the upper part of the saturator 1.

The base of the saturator is provided with an orifice 9 controlled by the filling valve of the dosing device 10 and communicating with the apportioning vessel 11, which is connected to the reservoir 7 for gas under pressure via the valve 12 and the conduit 8 bis, in order to enable the flushing action to take place, causing the saturated product to pass into the receiving flask, and enabling the complementary propulsive gas to be correctly apportioned.

The base 13 of the apportioning vessel, sealed by the valve 14, is fitted with a connecting socket 15, with a vacuum contact 16 and a valve 16' which are connected to a vacuum reservoir 19 and to a vacuum pump 20.

The flask or vessel 17 to be filled is fitted by its valve to the positioning socket, which has a tight joint.

The advantages and the operation of this device will thus be evident.

When the valves 10 and 14 are closed, the cock feeding the conduit 8 is open.

The pump 2 conveys the product to the dividing device 4 and distributes it in the saturator 1.

The product, injected in the form of "rain," becomes saturated with gas.

The valve 10 is opened, and the liquid descends into the apportioning vessel, while the gas contained in this latter re-ascends into the saturator and completes the saturation by a splashing action.

The diameter selected for the conduit 9 and the valve 10 ensures the movement of the liquid and the gas on the counterflow principle without any capillary effect.

During the filling of the apportioning device the vacuum valve 16 is open and produces a vacuum in the flask 17, which has been fitted in advance to the end socket 15.

The said valve 16 is closed at the time when the valve 10 and the valves 12 and 14 are open.

The product contained in the apportioning vessel 11 is forced by a flushing action into the flask 17 by the gases arriving through the valve 12.

The flask 17, having a greater volume than the apportioning vessel 11, is not completely filled by the liquid apportioned.

Above the level of the liquid there is a certain residual volume 18 supplied in addition with the flushing gas, which is thus apportioned in the quantity and at the pressure required for the subsequent operation of the flask.

Valves 12 and 14 are closed.

The full flask 17 is replaced, the valves 10 and 16 are opened, and a fresh cycle commences.

The valves can be operated by pneumatic jacks or other such devices, themselves controlled by the electrically operated valves, which are actuated by an electronic cabinet with timed cycles or by any other system, the entire process taking place automatically and either continuously or stroke by stroke.

Furthermore, the apportioning vessel 11 is interchangeable according to the volume of the flask to be filled and the durations of the cycles, which are modifiable, and this filling device can be used, without any limitation as regards its application, for all fluid or semi-fluid products.

The shapes, dimensions and arrangements adopted for the various elements may nevertheless vary, within the limits allowed by equivalent apparatus, as may also the materials used for their manufacture, without thereby departing from the general principle of the invention described in the foregoing.

I claim:

1. Apparatus for filling containers with a mixture of liquid product and propellant gas, comprising a mixing chamber having a valved outlet, means for supplying liquid product under pressure to said chamber, means for supplying gas under pressure to said chamber, a metering vessel communicating with the valved outlet and having a valved nozzle for connection to a container to be filled and a volume smaller than said container, means for supplying gas under pressure to and for flushing through the metering vessel, and valved means connected to the nozzle of the metering vessel downstream of its valve for applying suction to create a vacuum in a container connected to said nozzle.

2. Apparatus as claimed in claim 1, comprising means in the mixing chamber for starting and stopping a pump supplying the liquid product to the mixing chamber when the liquid product therein is at predetermined lower and upper levels.

3. Apparatus as claimed in claim 1, wherein both the means for supplying gas under pressure comprise a common gas reservoir.

4. Apparatus as claimed in claim 1, wherein the liquid product is supplied to the upper part of the mixing chamber through atomizing means.

References Cited

UNITED STATES PATENTS

| | | |
|---|---|---|
| 609,867 | 8/1898 | Bastian. |
| 783,386 | 2/1905 | Rice. |
| 2,613,023 | 10/1952 | Reich _____ 141—3 X |
| 2,671,529 | 3/1954 | Hungerford. |
| 3,211,191 | 10/1965 | Honisch _____ 141—20 |
| 3,232,324 | 2/1966 | Sokol _____ 141—3 |

FOREIGN PATENTS 1,265,286  5/1961  France.

LAVERNE D. GEIGER, Primary Examiner

E. J. EARLS, Assistant Examiner

U.S. Cl. X.R.

141—107; 222—373; 261—115